US009825508B2

(12) United States Patent
Kainuma et al.

(10) Patent No.: US 9,825,508 B2
(45) Date of Patent: Nov. 21, 2017

(54) LINEAR MOTOR DEVICE (75) Inventors: Makoto Kainuma, Chiryu (JP); Ryo Nagata, Chiryu (JP); Masatoshi Fujita, Chiryu (JP); Shuhei Yamada, Chiryu (JP)

(73) Assignee: FUJI MACHINE MFG. CO., LTD., Chiryu (JP)

( * ) Notice: Subject to any disclaimer, the term of this patent is extended or adjusted under 35 U.S.C. 154(b) by 528 days.

(21) Appl. No.: 14/387,632

(22) PCT Filed: Mar. 26, 2012

(86) PCT No.: PCT/JP2012/057797
§ 371 (c)(1),
(2), (4) Date: Sep. 24, 2014

(87) PCT Pub. No.: WO2013/145085
PCT Pub. Date: Oct. 3, 2013

(65) Prior Publication Data
US 2015/0061416 A1 Mar. 5, 2015

(51) Int. Cl.
*H02K 1/20* (2006.01)
*H02K 41/03* (2006.01)
(Continued)

(52) U.S. Cl.
CPC ............. *H02K 9/08* (2013.01); *H02K 1/20* (2013.01); *H02K 9/02* (2013.01); *H02K 9/20* (2013.01);
(Continued)

(58) Field of Classification Search
CPC .......... H02K 41/00–41/065; H02K 9/00–9/28; H02K 1/20
(Continued)

(56) References Cited

U.S. PATENT DOCUMENTS 6,339,269 B1 1/2002 Hsiao
6,954,010 B2 * 10/2005 Rippel .................... H02K 1/20
310/216.014
(Continued)

FOREIGN PATENT DOCUMENTS

CN 101895187 A 11/2010
JP 2001-268851 9/2001
(Continued)

OTHER PUBLICATIONS

Machine Translation, Naka, WO 2012004858 A1, Jan. 12, 2012.*
(Continued)

*Primary Examiner* — Thomas Truong
(74) *Attorney, Agent, or Firm* — Oblon, McClelland, Maier & Neustadt, L.L.P.

(57) ABSTRACT

A linear motor device includes a track member with multiple magnets with alternating N poles and S poles arranged along the moving direction, and a moving body with a configuration which includes an armature which is movably mounted on the track member; and the device generates a driving force in the moving direction between the magnetic flux created armature and the magnets of track member. The armature also includes a heat conduction member arranged in cooling passages formed in cores of the armature. By this, coils on the moving body side are cooled efficiently, and a large driving force can be achieved by passing a large current as well as maintaining a large space for winding the coils in order to increase the winding count.

10 Claims, 8 Drawing Sheets (51) Int. Cl.
*H02K 9/22* (2006.01)
*H02K 9/08* (2006.01)
*H02K 9/20* (2006.01)
*H02K 9/02* (2006.01)
*H02K 16/04* (2006.01)

(52) U.S. Cl.
CPC .............. *H02K 9/22* (2013.01); *H02K 41/031* (2013.01); *H02K 16/04* (2013.01)

(58) Field of Classification Search
USPC .................... 310/12.01–12.33, 52, 54, 58, 59
See application file for complete search history.

(56) References Cited

U.S. PATENT DOCUMENTS

| | | | |
|---|---|---|---|
| 2004/0135441 A1 | 7/2004 | Groening et al. | |
| 2005/0285451 A1* | 12/2005 | Kubo | G03F 7/70758 310/12.15 |
| 2009/0072634 A1* | 3/2009 | Vollmer | H02K 41/033 310/12.18 |
| 2010/0181848 A1* | 7/2010 | Nagasaka | H02K 41/03 310/12.29 |

FOREIGN PATENT DOCUMENTS

| | | | |
|---|---|---|---|
| JP | 2006-144697 | 6/2006 | |
| JP | 2006-197773 | 7/2006 | |
| JP | 2007-236152 | 9/2007 | |
| JP | 2008-245474 | 10/2008 | |
| JP | 2009-531002 | 8/2009 | |
| JP | 2010-172070 | 8/2010 | |
| JP | 4617338 | 1/2011 | |
| JP | 4636354 | 2/2011 | |
| JP | 2011-166957 | 8/2011 | |
| JP | WO 2012004858 A1 * | 1/2012 | ............ H02K 1/148 |
| WO | WO 2007/107420 A1 | 9/2007 | |

OTHER PUBLICATIONS

Combined Chinese Office Action and Search Report dated Feb. 4, 2017 in Chinese Patent Application No. 201280071788.4 (with English language translation).

International Search Report dated Jun. 19, 2012, in PCT/JP12/057797 filed Mar. 26, 2012.

Notification of Reasons for Refusal dated Jun. 22, 2017 in Japanese Patent Application No. 2016-201463 (submitting unedited computer generated English translation only).

\* cited by examiner

LINEAR MOTOR DEVICE

TECHNICAL FIELD

The present invention relates to a linear motor device, in particular, it relates to a linear motor device with improved cooling performance of the coil on the moving body side.

BACKGROUND ART

For board manufacturing equipment for producing boards mounted with multiple components, there are solder printing machines, component mounters, solder reflow machines, board inspection machines and so on, and there are many cases in which these are configured into board producing lines by linking them with a board conveyance device. Many of these board manufacturing equipment are equipped with a moving body which performs work after moving to a specified position above the board, and a linear motor device can be used as a means for moving the moving body. This type of linear motor device generally comprises a track member with multiple magnets with alternating N poles and S poles arranged along the moving direction, and a moving body which includes an armature with a core and coil.

Here, in order to achieve a large driving force with the linear motor device, there are three main means: (A) increase the current flowing through the coil; (B) increase the magnetic power of the magnets; (C) increase the permeability of the core. With regard to means (B) and (C), the physical limits are close to being reached with current technology and a rapid improvement in the future cannot be hoped for. It follows that, although (A) is a valid means, when a large current flows, copper loss in the core causes the amount of heat generated to increase and problems arise such as thermal deformation and thermal deterioration of the members of the configuration. Therefore, various cooling mechanisms for linear motor devices have been presented, such as those in patent literature 1 to 3.

With the linear motor applied for by this applicant in patent literature 1, fellow coils adjacent to multiple cores are arranged in a staggered manner and with gaps in between, with an end of a heat pipe inserted in the gaps between the coils and the other end of a heat pipe protruding from the gaps and with multiple fins provided. By using such a cooling mechanism which uses heat pipes, temperature rises in the coils making up the armature can be controlled well.

Also, the armature for a linear motor disclosed in patent literature 2 uses a core with slots formed between multiple pole teeth, and multiple excitation windings (coils) for exciting teeth sections thereof which are arranged in the slots, and piping for cooling is provided so that the section positioned inside the slot of the excitation winding is sandwiched from both sides. By this, it makes it such that cooling of the pole teeth and excitation windings can be performed efficiently.

Further, the linear motor disclosed in patent literature 3 comprises a stator with multiple permanent magnets in a row, and a moving element which has armature coils wound around a core, and is provided with a cooling unit between an armature attachment sheet which is provided on the upper section of the armature and a table which is arranged via a thermal insulation sheet even higher up, and a heat pipe and heat sink are provided inside the cooling unit. By this, it makes it such that heat can be effectively removed from the armature while ensuring no heat deformation by transmitting heat to the table.

Further, the linear compression device of patent literature 4 is within the linear motor, and is characterized in that it is configured with items including radiation passages formed contacting the bobbin wound around the coil, and a cooling fluid supply means which supplies cooling fluid to the radiation passages. In the accompanying claims, a radiation pipe as a radiation passage, oil as cooling fluid, and an oil pump as a cooling fluid supply means are each disclosed. By this, it makes it such that a shortened lifespan and decreased efficiency of the linear compression device due to excess heat of the coil are controlled.

CITATION LIST

Patent Literature

Patent Literature 1: Japanese Unexamined Patent Application Publication Number 2010-172070
Patent Literature 2: Japanese Patent Publication Number 4617338
Patent Literature 3: Japanese Patent Publication Number 4636354
Patent Literature 4: Japanese Unexamined Patent Application Publication Number 2006-144697

SUMMARY OF INVENTION

Problem to be Solved by the Invention

However, in patent literature 1 the heat pipes are arranged in the gaps between the coils, and in patent literature 2 piping for cooling is arranged between the pole teeth and excitation windings. Due to this, the space for winding the coils is reduced by just the amount of the heat pipes or piping for cooling, and it is not possible to wind a large quantity of times. Also, if the coil is wound many times while maintaining arrangement space for the heat pipes or piping for cooling, the armature becomes big which has the effect of also making the moving body larger.

Also, in patent literature 3, a cooling unit is provided above the armature, but this means it contacts the short side of the upper side of the conventional length of the coil in a linear motor. It follows that, heat is not sufficiently transferred from the coils to the cooling unit and it is not possible to efficiently cool the coils overall. Further, the temperature difference within the coils becomes larger, and because the current which can be conducted by the high temperature section is restricted, the driving force becomes smaller. Also, the mechanism for forcibly cooling comprising a cooling fluid supply means such as an oil pump, which is given as an example in patent literature 4, gives rise to other issues such as the electricity consumption and maintenance and so on of the oil pump and these cannot necessarily be overcome.

The present invention has been made in consideration of the problems in the background art, and an object thereof is to provide a linear motor device which uses a cooling mechanism which achieves a large driving force by increasing the quantity of winds by maintaining a large space for winding the coils as well as efficiently cooling the coils on the moving body side so that a large current can be flowed.

Means for Solving the Problem

One aspect of the present application solves the above problems is a linear motor device equipped with a track member with multiple magnets with alternating N poles and S poles arranged along the moving direction and a moving body using an armature which has a core and coil and which is movably mounted on the track member, which generates a driving force in the moving direction between the magnetic flux created by the core when current is passed through the coil and the magnets of the track member, wherein the armature also uses a heat conduction member with good thermal conduction properties arranged in a cooling passage formed in the core.

In another aspect of the present application, the cooling passage is a hole formed inside the core or a groove formed in the outer surface of the core.

In another aspect of the present application, the cores and coils of the armature are separated into three phases, and each phase core uses contacting protrusions on a side surface which contact each other between adjacent phases and regulate the positional relationship as well as extending partially the cross section through which the magnetic flux passes, and the cooling passage is formed in the contacting protrusion.

In another aspect of the present application, each of the phase cores uses multiple of the contacting protrusions respectively on both sides either facing another phase or facing outwards.

In another aspect of the present application, multiple of the cooling passages are formed in the contacting protrusions of the core.

In another aspect of the present application, a groove is formed in the contacting surface of the contacting protrusion which regulates the positional relationship between contacting adjacent contacting phases, and a shared heat conduction member is provided straddling the grooves of two contacting protrusions which protrude and contact each other.

In another aspect of the present application, a linear motor device is equipped with a track member with multiple magnets with alternating N poles and S poles arranged along the moving direction and a moving body configured including an armature which uses cores and coils and which is movably mounted on the track member, which generates a driving force in the moving direction between the magnetic flux created by the cores when current is passed through the coils and the magnets of the track member, wherein the cores and coils of the armature are separated into three phases and the armature, as well as being arranged between adjacent phases of cores and regulating the positional relationship of the cores, is formed from a material with high thermal conductivity and also uses inside a heat transfer block provided with a heat conduction member with good thermal conductivity properties.

In another aspect of the present application, the armature uses multiple heat transfer blocks between adjacent phase cores and/or multiple heat conduction members are provided in the heat transfer blocks.

In another aspect of the present application, the heat conduction member is a heat pipe connected to the heat sink section arranged on the outside of the core.

In another aspect of the present application, the heat sink section is made from a base extending flatly and multiple heat dissipation fins established in a perpendicular direction to the surface of the base, and the heat pipes are made from heat pipe heat dissipation sections which extend connected to the bottom surface of the base of the heat sink section and heat pipe heat collection sections which are connected to the heat pipe heat dissipation sections and are arranged in the cooling passages.

SUMMARY OF INVENTION

In another aspect of the present application, cooling passages are formed in the core of the moving body and a heat conduction member with good heat conduction properties is arranged inside the cooling passages. The core is conventionally formed from iron or laminated with steel sheets of an alloy whose main component is iron and whose thermal conductivity is good, so heat generated by the coils is transferred to the heat conduction member via the core, and coils can be cooled efficiently and a large current can be flowed through the coils. Also, because the core is processed so that cooling passages are formed, the winding space for the coils is not reduced by the space surrounding the core being occupied by cooling passages as with conventional technology, so the quantity of winds can be increased compared to before. These overall effects mean that a driving force larger than before can be achieved. Looking at it another way, a given level of driving force can be achieved with an armature which is smaller than before.

In another aspect of the present application, the cooling passage is a hole formed inside the core or a groove formed in the outer surface of the core. It follows that, a cooling passage can be formed in the core by performing simple processing, which controls the rise in cost.

In another aspect of the present application, the cores and coils of the armature are separated into three phases, and each phase core uses a contacting protrusion in the side surfaces which extend partially the cross section through which the magnetic flux passes, and a cooling passage is formed in the contacting protrusion. Due to this, by the forming of the cooling passage, the core magnetic flux generation properties are not lowered, and a large driving force can be achieved based on the increased quantity of windings and current of the coil.

In another aspect of the present application, each phase core uses multiple contacting protrusions, and because a cooling passage is formed in each contacting protrusion, the quantity of cooling passages is increased and the coils can be cooled even more efficiently, and an even larger driving force can be achieved.

In another aspect of the present application, because multiple cooling passages are formed in the contacting protrusions of the cores, the quantity of cooling passages is increased and the coils can be cooled even more efficiently, and an even larger driving force can be achieved.

In another aspect of the present application, a shared heat conduction member is provided between the grooves of two contacting protrusions which contact each other between adjacent phases and a heat conduction member can be provided at two locations between phases. It follows that, even when the contacting protrusions have a narrow configuration, a heat conduction member can be provided and the coils can be cooled efficiently, a larger current than before can be flowed through the coils and a large driving force can be achieved.

In another aspect of the present application, the armature cores and coils are separated into three phases, and the armature, as well as regulating the positional relationship of adjacent phase cores, uses heat transfer blocks provided with heat conduction members. The heat transfer blocks can be formed from a material with higher thermal conductivity than the iron which is the main component making up the core. Heat generated in the coils is transferred to the heat conduction members via the heat transfer blocks with high heat conductivity, therefore the coils can be cooled efficiently. It follows that, a larger current than before can be flowed through the coils and a large driving force can be achieved.

In another aspect of the present application, the armature uses multiple heat transfer blocks between adjacent phase cores, and/or multiple heat conduction members are provided in the heat transfer blocks, therefore the quantity of heat conduction members is increased and the coils can be cooled even more efficiently, and an even larger driving force can be achieved.

In another aspect of the present application, the heat conduction members are made from heat pipes connected to the heat sink section arranged on the outside of the core, therefore the coils can be cooled remarkably efficiently using the convection and phase changing of a refrigerant, and a remarkably large driving force can be achieved.

In another aspect of the present application, the heat sink section is made from a base and multiple heat dissipation fins, and the heat pipes are made from heat pipe heat dissipation sections which extend connected to the bottom surface of the base and heat pipe heat collection sections which are connected to the heat pipe heat dissipation sections and are arranged in the cooling passages, therefore the efficiency of the heat transfer from the cooling passages to the heat dissipation fins is extremely high. It follows that, the coils can be cooled remarkably efficiently using the convection and phase changing of a refrigerant, and a remarkably large driving force can be achieved.

BRIEF DESCRIPTION OF DRAWINGS

FIG. 2 (1) is a top view cross section of the linear motor device of embodiment 1, and (2) is a side view of the moving body.

FIG. 5 (1) is a top view of the moving body to illustrate the heat sink section, and (2) is a top view of the moving body with the heat sink section and upper attachment plate removed.

DESCRIPTION OF EMBODIMENTS

Figure 1:
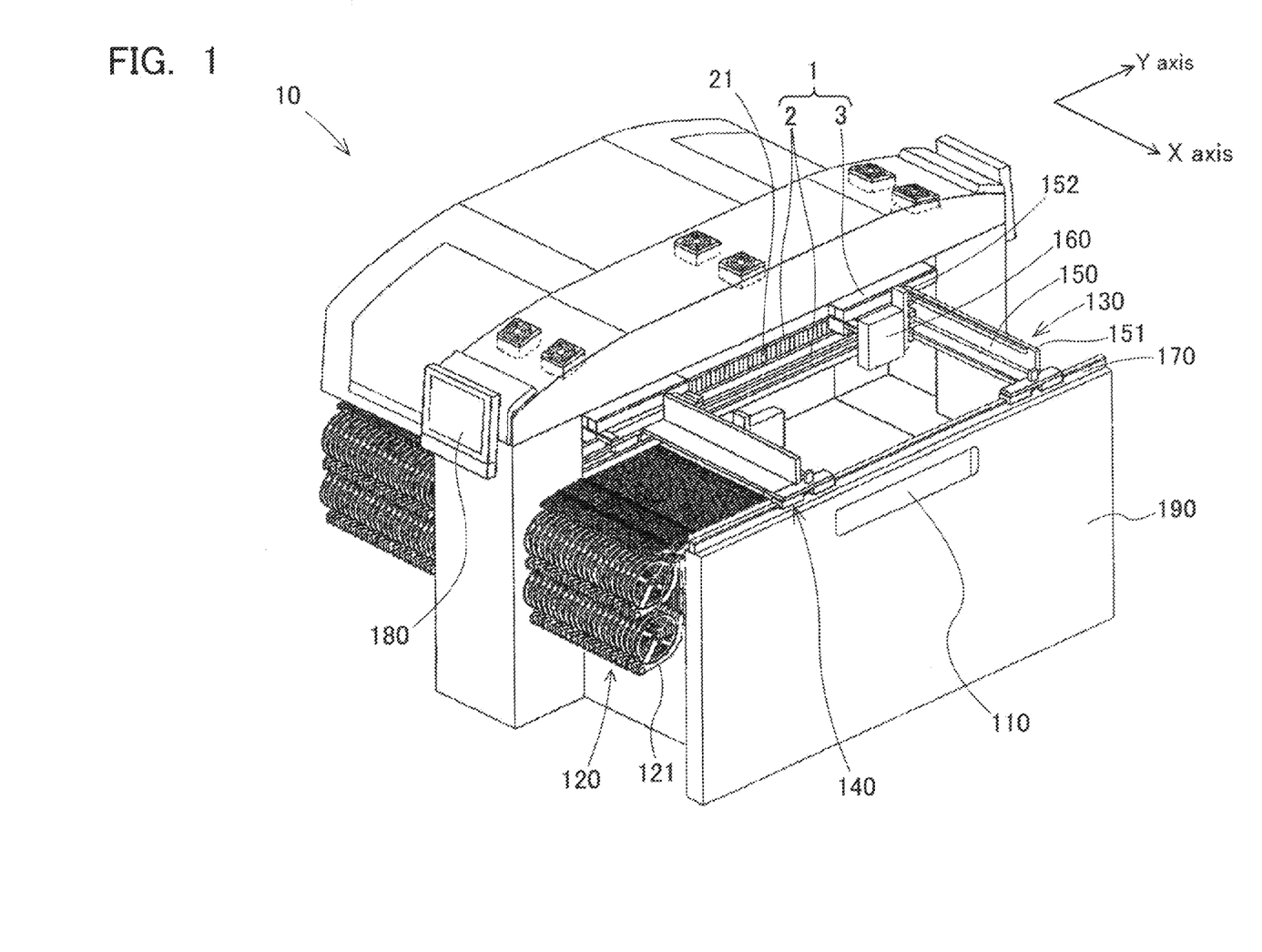
FIG. 1 This is a perspective view showing the overall configuration of a component mounter which can use the linear motor device of the present invention.
Figure 2:
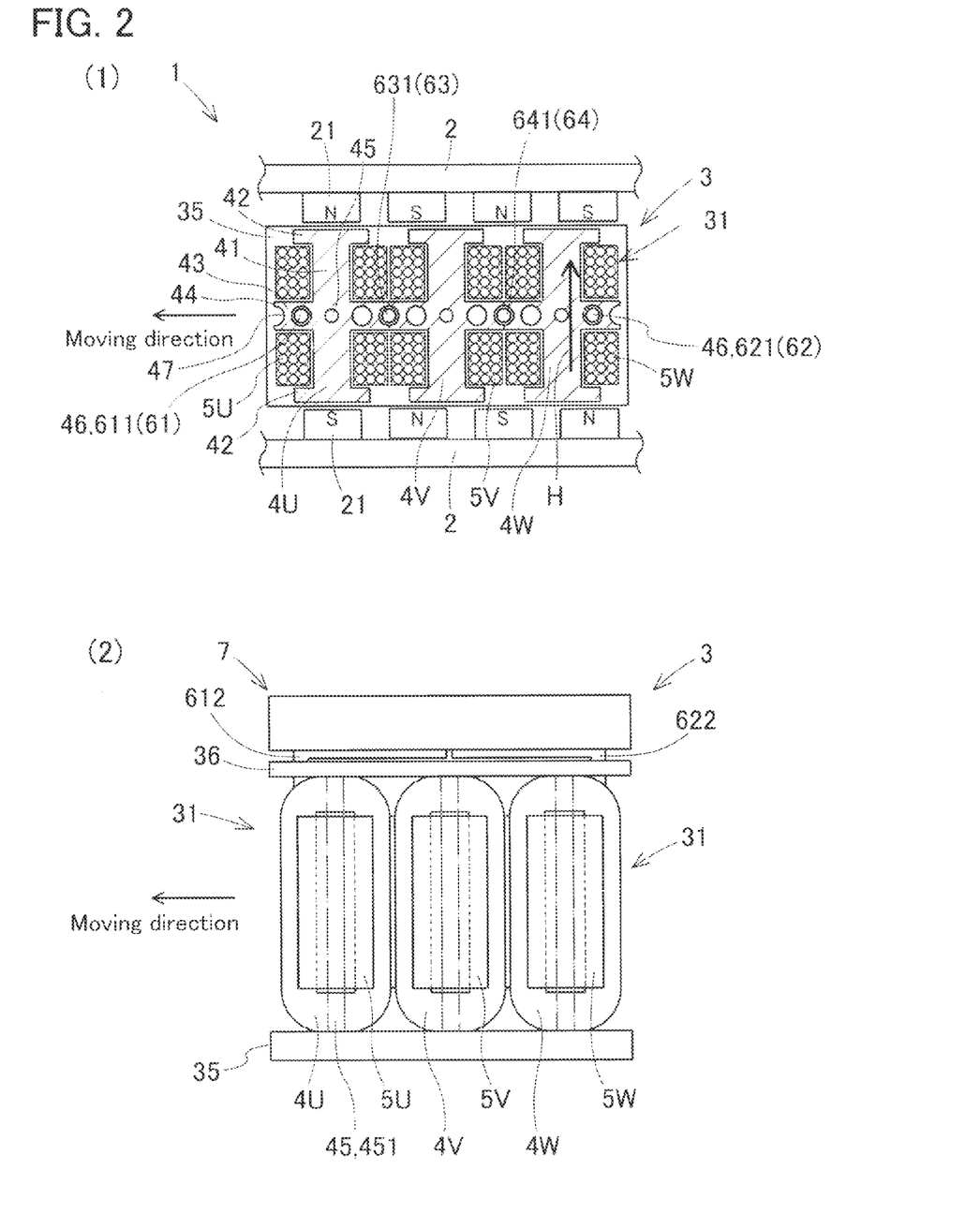

First, component mounter 10 which can use the linear motor device of the present invention is described with reference to FIG. 1. FIG. 1 is a perspective view showing the overall configuration of component mounter 10 which can use linear motor device 1 of the present invention. Component mounter 10 is a device for mounting many components onto a board, and has a configuration in which two sets of component mounting units with the same construction are arranged largely with bilateral symmetry. Here, the component mounting unit at the front right side of FIG. 1 is described as an example. In the figure, the width of component mounter 10 going from the left rear side to the front right side is the X-axis direction, and the length of component mounter 10 is the Y-axis direction.

Component mounter 10 is configured with board conveyance device 110, component supply device 120, two component transfer devices 130 and 140, and so on assembled to base 190. Board conveyance device 110 is transversely in the X-axis direction around the center of the lengthwise direction of component mounter 10. Board conveyance device 110 uses a conveyor which is omitted from the figure and conveys boards in the X-axis direction. Also, board conveyance device 110 uses a clamp device which is omitted from the figure and secures and holds boards at a predetermined mounting work position. Component supply device 120 is provided at the front section (the left front side of FIG. 1) in the lengthwise direction of component mounter 10. Component supply device 120 uses multiple cassette type feeders 121, and components are consecutively supplied to the two component transfer devices 130 and 140 from carrier tape set in each feeder 121.

The two component transfer devices 130 and 140 are what are known as XY-robot type devices, which can move in the X-axis direction and Y-axis direction. The two component transfer devices 130 and 140 are arranged facing each other at the front side and rear side of component mounter 10 in the lengthwise direction. In order to move each component transfer device 130 and 140 in the Y-axis direction, linear motor device 1 of embodiment 1 is used. Also, in order to move each component transfer device 130 and 140 in the X-axis direction, a ball screw mechanism is used, and each component transfer device 130 and 140 is equipped with component mounting head 160 which moves along X-axis rail 150 and X-axis rail 150 which extend in the X-axis direction. An end 151 of X-axis rail 150 is movably mounted on support rail 170, and the other end 152 is connected to moving body 3 of linear motor device 1 such that it moves in the Y-axis direction. Pickup nozzles which are omitted from the figure are provided on the lower side of component mounting head 160, and the pickup nozzles use negative pressure to pick up components from component supply device 120 and mount them on the board at the mounting work position.

Component mounter 10 is also provided with display settings device 180 for exchanging information with operators, cameras for capturing images of boards and components which are omitted from the figure, and so on.

Linear motor device 1 comprises track member 2 shared for the two component transfer devices 130 and 140, and moving bodies 3 for each of the two component transfer devices 130 and 140. Track member 2 is arranged parallel on both sides sandwiching moving bodies 3 and extends in the Y-axis direction which is the moving direction. On the internal facing surfaces of track member 2, multiple magnets 21 are arranged in a row in the Y-axis direction. Moving bodies 3 are movably mounted on track member 2.

Figure 3:
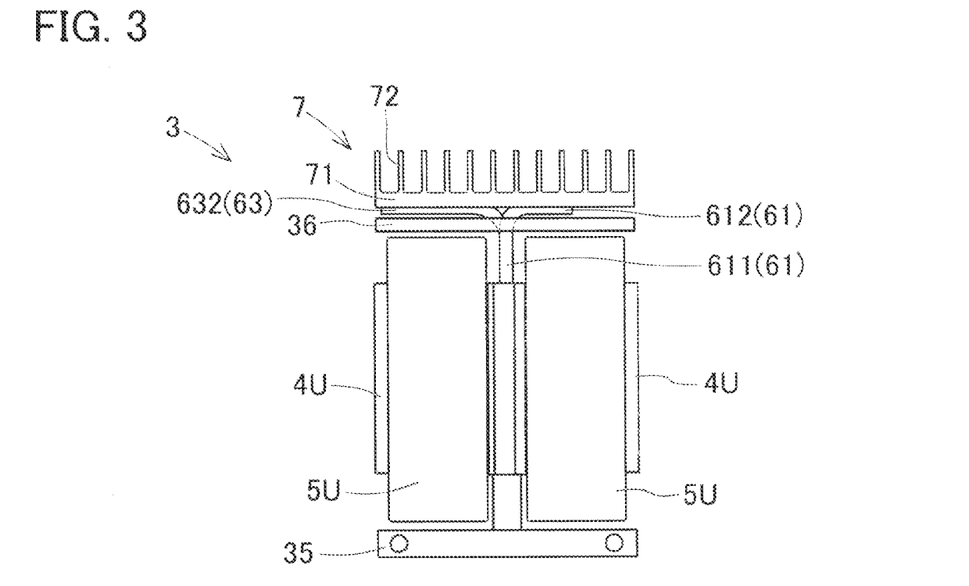
FIG. 3 This is a front view of the moving body seen from the front.

Next, details are given about linear motor device 1 of embodiment 1. In FIG. 2, (1) is a top view of linear motor device 1 of embodiment 1, and (2) is a side view of moving body 3. The left/right direction in FIG. 2 is the moving direction of moving body 3 and for convenience here the left side of moving body 3 is the front side. Also, FIG. 3 is a front view of moving body 3 seen from the front.

Track member 2, as shown in FIG. 2 (1), is arranged on both sides (the top and bottom sides in the figure) sandwiching moving body 3 and extends in the moving direction (the left/right direction in the figure). On the internal facing surfaces of track member 2, multiple magnets 21 are arranged in a row in the moving direction with alternate N poles and S poles. Magnets 21 facing each other sandwiching moving body 3 have different polarity to each other.

Moving body 3 includes armature 31 with three phases each separated. Armature 31 uses cores 4U, 4V, and 4W for each phase and coils 5U, 5V, and 5W. The three phase cores 4U, 4V, and 4W, and coils 5U, 5V, and 5W are lined up in the moving direction above lower attachment plate 35, and are assembled being pushed down on by upper attachment plate 36. Lower attachment plate 35 and upper attachment plate 36 are largely the same size rectangles with upper attachment plate 36 being thinner. Lower attachment plate 35 and upper attachment plate 36 are formed from a strong material such as aluminium and are equipped as appropriate with securing seats or securing holes which are omitted from the figure. Moving body 3 is equipped with at least one set of three phase armature 31 between lower attachment plate 35 and upper attachment plate 36, and multiple sets of armature 31 may be lined up in the moving direction.

Figure 4:
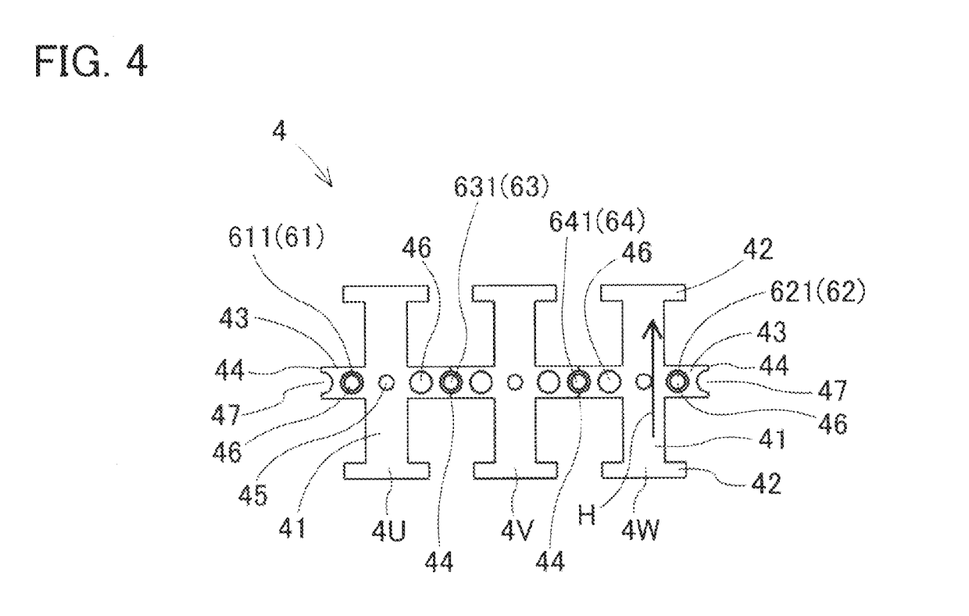
FIG. 4 This is a top view showing the cross sectional shape of the cores.
Figure 5:
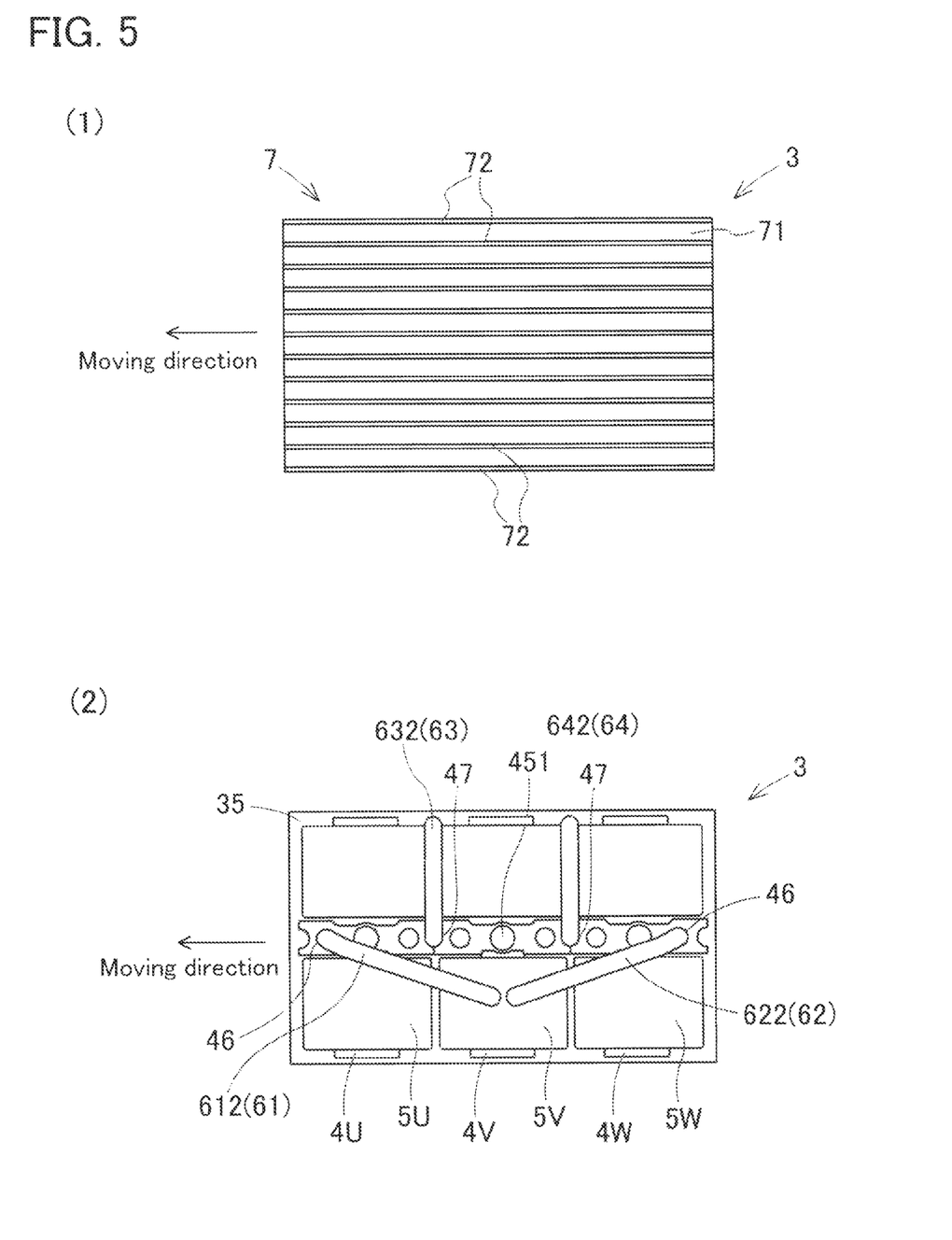

Cores 4U, 4V, and 4W are formed multiple layered electromagnetic steel plate which are stamped out using a press machine. FIG. 4 is a top view showing the top view of cores 4U, 4V, and 4W, and this view also matches the top view of the shape of the electromagnetic steel plate. As shown in the figure, the top view shape of cores 4U, 4V, and 4W is basically a cross shape, with yoke 41 extending in the width direction (the up/down direction in FIG. 4) perpendicular to the moving direction and passing through magnetic flux H. At each end of yoke 41 respectively magnetic pole forming members 42 extend from the yoke 41. The combination of the yoke 41 and the magnetic pole form members 42 approximately having an "I" shape in the top view. When current is passed through coils 5U, 5V, and 5W, an N pole is generated at one magnetic pole forming member 42 and an S pole generated at the other, and driving force is generated between track member 2 and magnets 21.

Contacting protrusions 43 respectively protrude in the front direction and rear direction from the center of the side surface of the moving direction front/rear of yoke 41. Contacting protrusions 43 partially spread out the cross section through which magnetic flux H passes. Between the adjacent front side core 4U and center core 4V, and between center core 4V and rear side core 4W, contacting protrusions 43 contact each other at the top contacting surface 44 and thereby regulate the positional relationship. Also, at the front side of front side core 4U and the rear side of rear side core 4W, the contacting surfaces 44 of contacting protrusions 43 are facing outwards.

In the center of each core 4U, 4V, and 4W, fastening holes 45 which penetrate in the up/down direction are formed. As shown in FIG. 2 (2), fastening rod 451 is inserted into fastening hole 45, and the top and bottom ends of fastening rod 451 are fastened to upper attachment plate 36 and lower attachment plate 35. Also, generally in the center of each contacting protrusion 43 of cores 4U, 4V, and 4W, cooling holes 46 are formed extending in the up/down direction. Further, in contacting surface 44 of contacting protrusion 43, cooling groove 47 with a semicircular cross section is formed extending in the up/down direction. Cooling holes 46 and cooling grooves 47 correspond to the cooling passages of the present invention. Fastening holes 45, cooling holes 46, and cooling grooves 47 can be formed without increasing the quantity of manufacturing processes by changing the stamping mold of the press machine from the current one.

Heat pipe heat collection sections 611 and 621 of heat pipes 61 and 62 which correspond to the heat conduction members of the present invention are provided in cooling hole 46 of contacting protrusion 43 of the front side of front side core 4U and cooling hole 46 of contacting protrusion 43 of the rear side of rear side core 4W. Further, a space extending in the up/down direction with a circular cross section straddling the two cooling grooves 47 is formed between contacting protrusion 43 of the rear side of front side core 4U and contacting protrusion 43 of the front side of center core 4V. Heat pipe heat collection section 631 of heat pipe 63 is provided in this space. In the same way, a space extending in the up/down direction with a circular cross section straddling the two cooling grooves 47 is formed between contacting protrusion 43 of the rear side of center core 4V and contacting protrusion 43 of the front side of rear core 4W. Heat pipe heat collection section 641 of heat pipe 64 is provided in this space.

On the other hand, coils 5U, 5V, and 5W are formed wound and divided around the left/right of yokes 41 which are separated from contacting protrusions 43 of cores 4U, 4V, and 4W, and the wind quantity is the same on the left and the right. Three phase coils 5U, 5V, and 5W are connected to a Y connection wire or delta connection wire and current is passed from the electric power source loaded on moving body 3 which is omitted from the figure so that the size of the current and the flow direction can be adjusted.

Four heat pipes 61 to 64 and heat sink section 7 are provided on moving body 3 as items for cooling coils 5U, 5V, and 5W. FIG. 5 (1) is a top view of moving body 3 to illustrate heat sink section 7, and (2) is a top view of moving body 3 with heat sink section 7 and upper attachment plate 36 removed.

As shown in FIG. 3 and FIG. 5 (1), heat sink section 7 is fixedly held above and separated by a gap from upper attachment plate 36 of moving body 3. Heat sink section 7 is made from base 71 formed from a rectangular thin plate about the same size as lower attachment plate 35 and upper attachment plate 36, and multiple thin plate heat dissipation fins 72 established in a perpendicular direction from the upper surface of base 71. In the example shown in the figure, twelve heat dissipation fins 72 are established parallel to the moving direction. By this, air passes in between heat dissipation fins 72 when moving body 3 moves, so that cooling is performed efficiently. For heat sink section 7, it is desirable for it to be manufactured from a metal with high thermal conductivity and good heat dissipation, and it is desirable for it to be light in order to control the weight increase to moving body 3; for example, it can be manufactured by casting using aluminium.

On the other hand, each heat pipe 61 to 64 is respectively made from heat pipe heat collection section 611, 621, 631, and 641, and heat pipe heat dissipation section 612, 622, 632, and 642. Each heat pipe heat collection section 611, 621, 631, and 641, as given above, are provided in cooling grooves 47 and cooling holes 46 of cores 4U, 4V, and 4W. As shown in the example in FIG. 3, each heat pipe heat collection section 611, 621, 631, and 641, after rising above cores 4U, 4V, and 4W, passes through holes formed in upper attachment plate 36 and is connected to heat pipe heat dissipation section 612, 622, 632, and 642.

Heat pipe heat dissipation sections 612, 622, 632, and 642 extend in the horizontal direction connected to the bottom surface of base 71 of heat sink section 7. As shown in FIG. 5 (2), at heat pipe 61 which comes up out of cooling hole 46 of the front side of the front side core 4U, heat pipe heat dissipation section 612 extends towards the rear at an angle, and the tip thereof finishes around the center of the moving direction of moving body 3. Also, at heat pipe 62 which comes up out of cooling hole 46 of the rear side of the rear side core 4W, heat pipe heat dissipation section 622 extends towards the front at an angle, and the tip thereof finishes around the center of the moving direction of moving body 3.

Further, at the two heat pipes 63 and 64 which come up out of cooling grooves 47 between cores 4U, 4V, and 4W, heat pipe heat dissipation sections 632 and 642 extend in the left/right direction, and the tips thereof finish around the edge surface of the moving body. The location at which each heat pipe heat collection section 611, 621, 631, and 641 of the four heat pipes 61, 62, 63, and 64 are provided, and the length and extending direction of each heat pipe heat dissipation section 612, 622, 632, and 642, are decided based on design considerations so that cooling of the three phase coils 5U, 5V, and 5W can be performed at around the same level.

As a refrigerant to be enclosed inside heat pipes 61 to 64, water can be used for example, but it is also acceptable to use another refrigerant not limited to this. Also, for embodiment 1, it is not necessary for the heat conduction member to be heat pipes 61 to 64 which rely on phase changing of a refrigerant, it is also acceptable to use a condenser which performs circulation convection of cooling oil enclosed in cooling pipes.

Next, the cooling operation of coils 5U, 5V, and 5W in linear motor device 1 of embodiment 1 configured as given above is described. When electric current is passed through coils 5U, 5V, and 5W in order to move moving body 3, heat is generated due to copper loss. Here, because the thermal conduction of cores 4U, 4V, and 4W is good, heat generated in coils 5U, 5V, and 5W is transferred via cores 4U, 4V, and 4W to heat pipe heat collection sections 611, 621, 631, and 641. When this is done, water inside heat pipe heat collection sections 611, 621, 631, and 641 evaporates and undergoes a phase change into water vapor, thereby giving rise to a cooling effect corresponding to the latent heat of vaporization. On the other hand, the water vapor moves by convection to heat pipe heat dissipation sections 612, 622, 632, and 642, is cooled and returns to the liquid phase of water in heat sink section 7, and travels back to heat pipe heat collection sections 611, 621, 631, and 641.

The thermal transfer using heat pipes 61, 62, 63, and 64 as given above operates the same with respect to the heat from the iron loss generated by cores 4U, 4V, and 4W. Additionally, natural cooling is also performed at the outer surfaces of coils 5U, 5V, and 5W, and cores 4U, 4V, and 4W. By continuing these cooling operations, the temperature rise of coils 5U, 5V, and 5W, and cores 4U, 4V, and 4W can be maintained within allowable values.

According to linear motor device 1 of embodiment 1, heat generated in coils 5U, 5V, and 5W is transferred via cores 4U, 4V, and 4W to heat pipes 61, 62, 63, and 64, and coils 5U, 5V, and 5W can be cooled efficiently. Also, compared to the conventional configuration shown in FIG. 12, the quantity of winds of coils 5U, 5V, and 5W can be increased.

Figure 12:
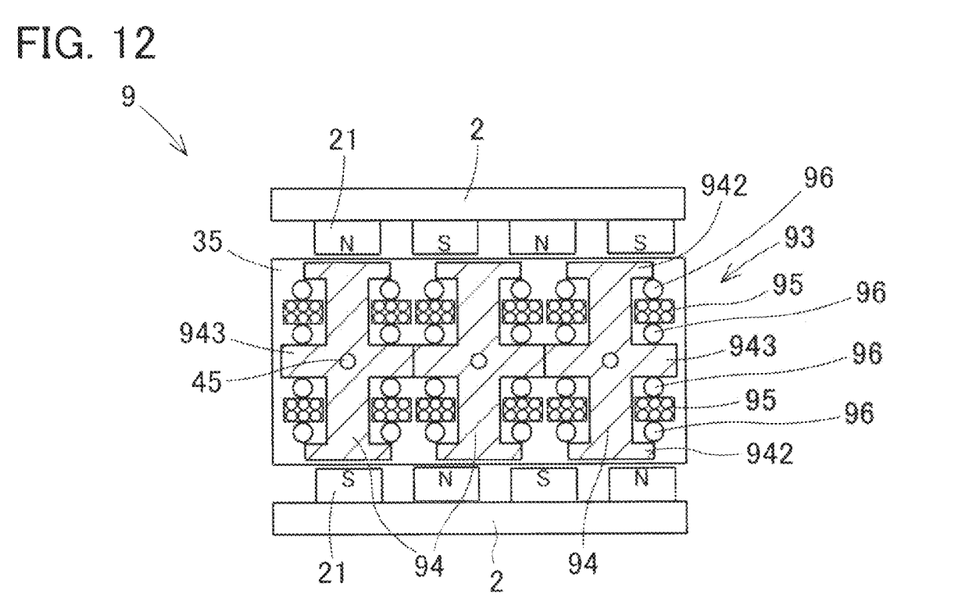
FIG. 12 This is a cross section view of a linear motor device with a conventional configuration.

To give an additional description, FIG. 12 is a cross section view of a conventional configuration linear motor device 9, and the arrangement of cooling passages in armature 93 is different to that in embodiment 1. As shown in the figure, with a conventional configuration, cooling passages 96 are provided between contacting protrusion 943 of core 94 and coil 95, and between magnetic pole forming member 942 and coil 95. Due to this, the space for winding coil 95 is reduced by just the amount of cooling passage 96, and it is not possible to wind a large quantity of times. In contrast to this, in embodiment 1, because cores 4U, 4V, and 4W are processed so that cooling passages (cooling holes 46 and cooling grooves 47) are formed, the winding space of coils 5U, 5V, and 5W is not reduced and the quantity of winds can be increased compared to previously.

Further, because heat sink section 7 is made from base 71 and multiple heat dissipation fins 72, and heat pipes 61, 62, 63, and 64 are made from heat pipe heat dissipation sections 612, 622, 632, and 642 which extend connected to the bottom surface of base 71, and heat pipe collection sections 611, 621, 631, and 641 inside cores 4U, 4V, and 4W, the heat transfer efficiency is extremely high. Additionally, because cooling passages (cooling hole 46 and cooling groove 47) are formed in contacting protrusions 43 of cores 4U, 4V, and 4W, the generation ability of magnetic flux H is not lowered, and the achievable driving force corresponds to the winding quantity and current of coils 5U, 5V, and 5W. By these overall effects, a current larger than previously can be passed through coils 5U, 5V, and 5W, and a remarkably large driving force can be achieved.

Also, because the cooling passages (cooling holes 46 and cooling grooves 47) can be easily formed by changing the stamping mold of the press machine which processes the electromagnetic steel sheet, cost rises can be controlled.

Figure 6:
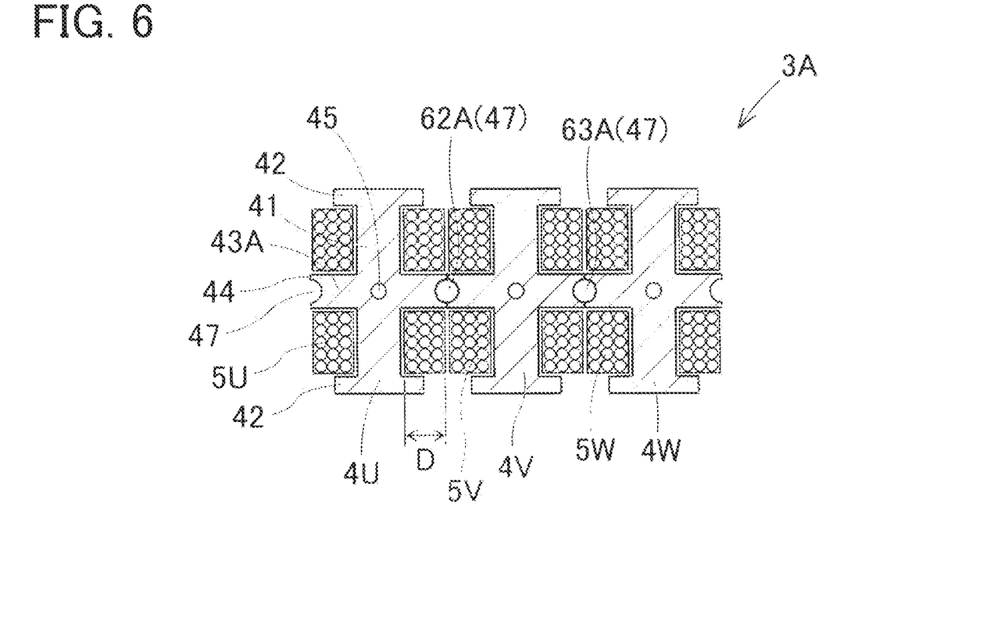
FIG. 6 This is a cross section view of the armature of the linear motor device of embodiment 2.
Figure 7:
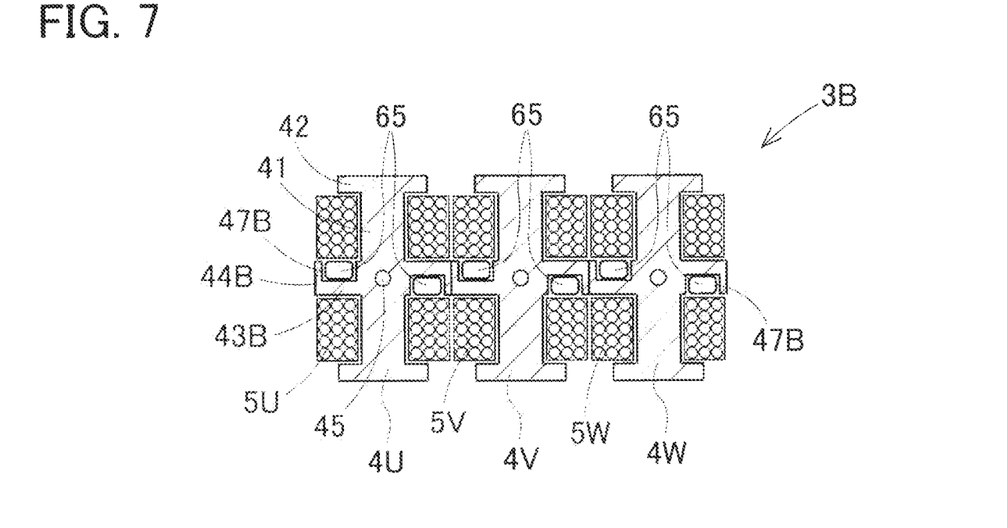
FIG. 7 This is a cross section view of the armature of the linear motor device of embodiment 3.
Figure 8:
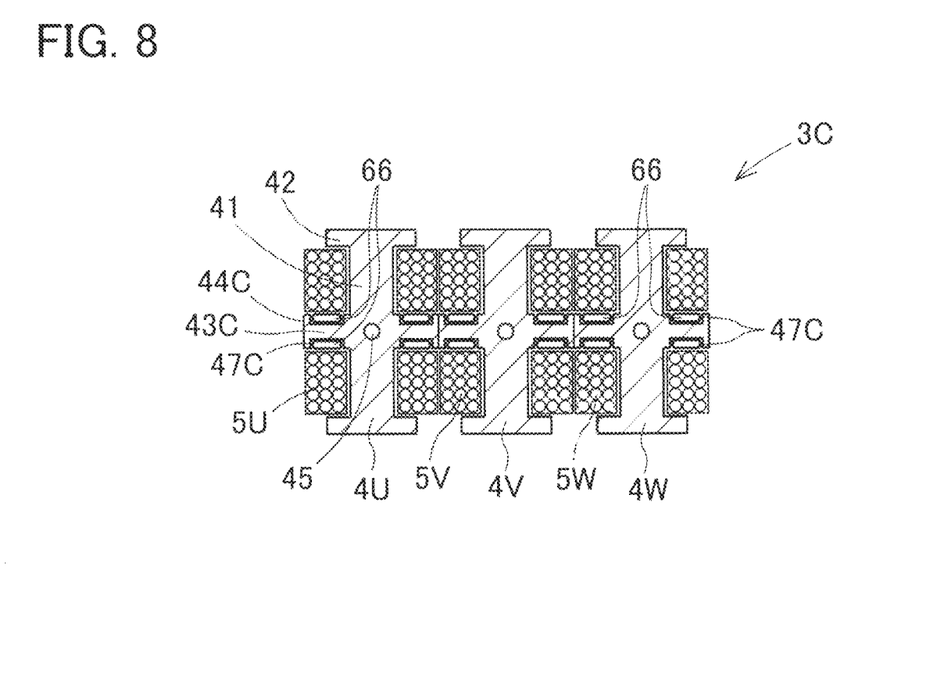
FIG. 8 This is a cross section view of the armature of the linear motor device of embodiment 4.

Next, an embodiment with a changed form of cooling passages is described. FIG. 6, FIG. 7, and FIG. 8 are cross section views of linear motor device armatures 3A, 3B, and 3C of embodiments 2, 3, and 4 respectively. For embodiment 2 shown in FIG. 6, cooling groove 47 is formed in contacting surface 44 without cooling hole 46 being formed in each contacting protrusion 43A of cores 4U, 4V, and 4W. And, a space extending in the up/down direction with a circular cross section straddling the two cooling grooves 47 of contacting surfaces 44 which contact each other is formed in two locations, and heat pipes 62A and 63A are provided in these two locations.

The linear motor device of embodiment 2 is effective in cases in which, for example, the winding thickness dimension D of coils 5U, 5V, and 5W is small, and forming cooling holes is difficult because contacting protrusions 43A are narrow. In other words, even if cooling holes 46 are impossible, shared heat pipes 62A and 63A straddling two cooling grooves 47 can be provided in two locations. It follows that, even in cases in which contacting protrusions 43 have a narrow configuration, coils 5U, 5V, and 5W can be cooled efficiently, and a larger current than previously can be passed through coils 5U, 5V, and 5W, and a large driving force can be achieved.

For embodiment 3 shown in FIG. 7, a cooling groove 47 is not provided in contacting surface 44B and a cooling hole 46 is not provided in each contacting protrusion 43B of cores 4U, 4V, and 4W. Instead, a cooling groove 47B with a rectangular cross section is formed in one side of a surface facing coils 5U, 5V, and 5W of contacting protrusion 43B. Cooling grooves 47B are provided differently at each of the two contacting protrusions 43B of each core 4U, 4V, and 4W, and, when looking at the three phases, six cooling grooves 47B are provided in a staggered formation, and heat pipes 65 are provided in each of these six cooling grooves 47B.

Further, for embodiment 4 shown in FIG. 8, a cooling groove 47 is not provided in contacting surface 44C and a cooling hole 46 is not provided in each contacting protrusion 43C of cores 4U, 4V, and 4W. Instead, cooling grooves 47C which are rectangular with a shallow depth are formed at both sides respectively of surfaces facing coils 5U, 5V, and 5W of contacting protrusion 43C. There are a total of twelve cooling passages 47C for the three phases, and each is provided with heat pipe 66.

The quantity and arrangement of heat pipes 65 and 66 of the linear motor devices of embodiments 3 and 4 are different to that of embodiment 1, but the operation and effects are the same as embodiment 1.

Figure 9:
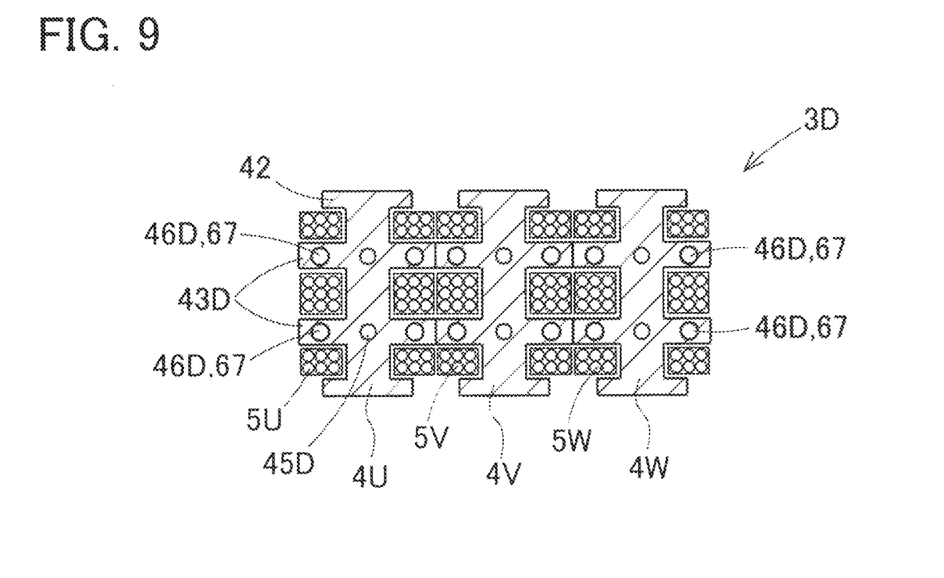
FIG. 9 This is a cross section view of the armature of the linear motor device of embodiment 5.

Next, embodiment 5 which has multiple contacting protrusions 43D is described. FIG. 9 is a cross section view of armature 3D of the linear motor device of embodiment 5. In embodiment 5, two each of contacting protrusions 43D are provided in the width direction perpendicular to the moving direction, so when considering the front side and rear side, a total of four each are provided on each core 4U, 4V, and 4W. Coils 5U, 5V, and 5W are wound being split into three in the width direction. And, one cooling hole 46D is formed in each contacting protrusion 43D, and heat pipe 67 is provided in each of these. Also, two each of fastening holes 45D are formed in each core 4U, 4V, and 4W.

According to the linear motor device of embodiment 5, the quantity of heat pipes 67 provided in the width direction is increased, coils 5U, 5V, and 5W can be cooled even more efficiently, and an even larger driving force can be achieved.

Figure 10:
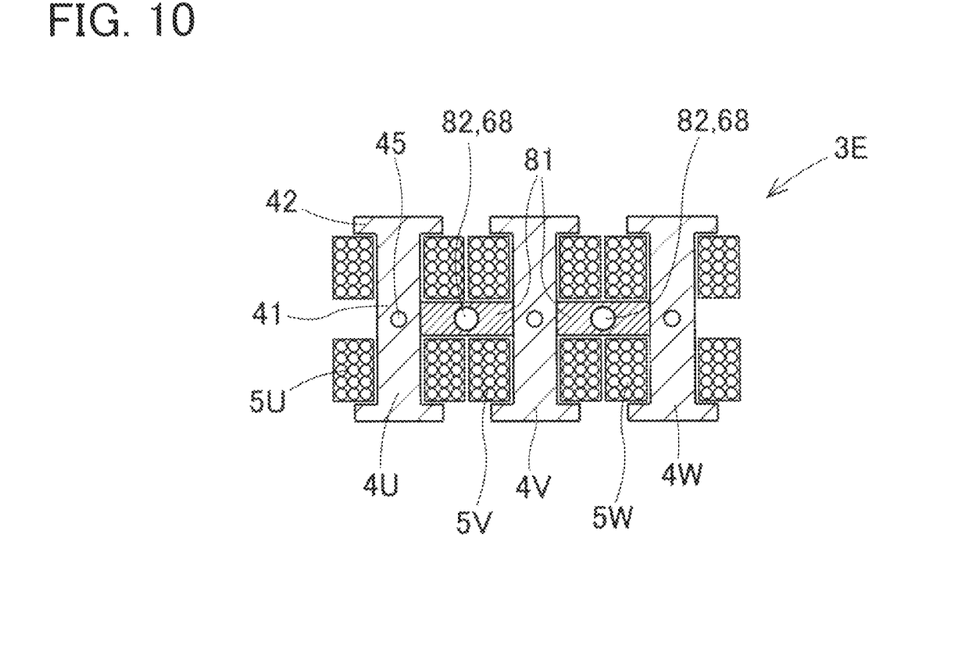
FIG. 10 This is a cross section view of the armature of the linear motor device of embodiment 6.

Next, embodiment 6 which uses heat transfer block 81 without performing processing on cores 4U, 4V, and 4W. FIG. 10 is a cross section view of armature 3E of the linear motor device of embodiment 6. In embodiment 6, contacting protrusions 43 are not provided on cores 4U, 4V, and 4W which comprise armature 3E. Instead, armature 3E uses heat transfer blocks 81 which are provided between adjacent cores 4U, 4V, and 4W and which regulate the positional relationship of adjacent cores. In other words, as in FIG. 10, number one heat transfer block 81 is provided between front side core 4U and center core 4V, and number two heat transfer block 81 is provided between center core 4V and rear side core 4W. Heat transfer blocks 81 have a predetermined length in the moving direction and are inserted between yoke 41 of adjacent phase cores 4U, 4V, and 4W and regulate the positional relationship thereof.

Also, heat transfer blocks 81 are formed from a material with higher thermal conductivity than the iron which is the main component making up cores 4U, 4V, and 4W, such as copper, and a cooling hole 82 is formed in the up/down direction therein, and heat pipes 68 are provided in cooling holes 82. The thickness of transfer blocks 81 in the direction perpendicular to the moving direction is equivalent to the interval of wound coils 5U, 5V, and 5W. In other words, heat transfer blocks 81 contact each respective coil 5U, 5V, and 5W on both surfaces, so the thermal conduction is good. In embodiment 6, most of the heat generated in coils 5U, 5V, and 5W is transferred to heat pipes 68 from heat transfer blocks 81.

Comparing embodiment 6 to embodiment 1, a section of cores 4U, 4V, and 4W is changed to a heat transfer block, and the thermal conduction to heat pipes 68 from coils 5U, 5V, and 5W is improved. It follows that a current larger than in embodiment 1 by just the amount corresponding to the improved cooling ability can be passed through coils 5U, 5V, and 5W, and it is possible to achieve a remarkably large driving force.

Figure 11:
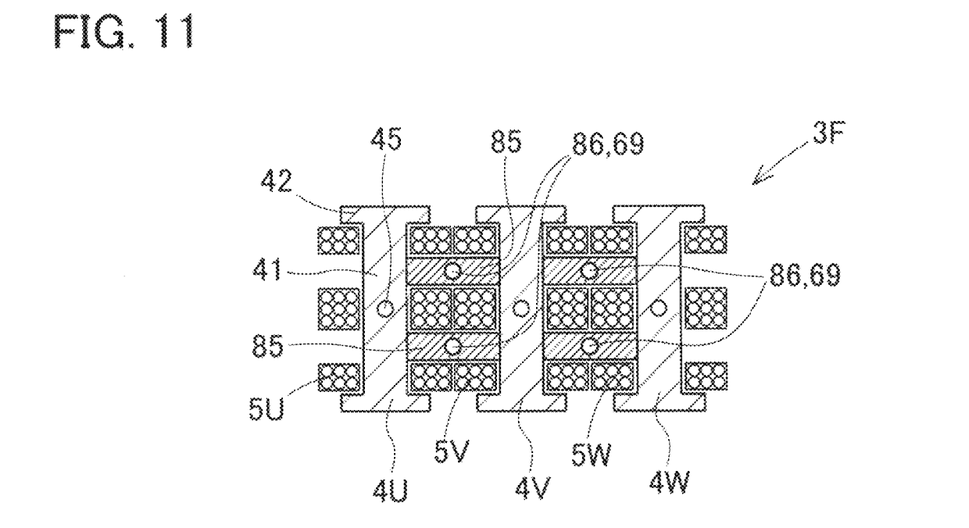
FIG. 11 This is a cross section view of the armature of the linear motor device of embodiment 7.

Next, embodiment 7 which has multiple heat transfer blocks 85 is described. FIG. 11 is a cross section view of armature 3F of the linear motor device of embodiment 7. In embodiment 7, two each of heat transfer blocks 85 are provided in the width direction perpendicular to the moving direction, so when considering the intervals in two locations, a total of four are provided. Coils 5U, 5V, and 5W are wound being split into three in the left/right direction. And, a cooling hole 86 is respectively formed in each transfer block 85, and heat pipe 69 is provided in each cooling hole 86. According to the linear motor device of embodiment 7, the quantity of heat transfer blocks 85 is increased, and coils 5U, 5V, and 5W can be cooled even more efficiently than in embodiment 6, a large current can be passed through and an even larger driving force can be achieved.

In each embodiment, linear motor device 1 was an item for moving component transfer device 130 and 140 in the Y-axis direction, however, it can also be used to move in the X-axis direction. Various other applications and modifications are possible for the present invention.

INDUSTRIAL APPLICABILITY

The present invention may be used in board manufacturing equipment other than component mounter 10, and it may further be used in other types of industrial assembly machines and industrial machine tools.

SYMBOL DESCRIPTIONS

1: Linear motor device
2: Track member
21: Magnet base plate
21i: Inner bottom surface
22: Side plate
22i: Inner side surface
3: Moving body
31, 3A, 3B, 3C, 3D, 3E, 3F: Armature
35: Lower attachment plate
36: Upper attachment plate
4U, 4V, 4W: Core
41: Yoke
42: Magnetic pole forming member
43, 43A, 43B, 43C: Contacting protrusion
44, 44B, 44C: Contacting surface
45: Fastening hole
451: Fastening rod
46, 46D: Cooling hole (cooling passage)
47, 47B, 47C: Cooling groove (cooling passage)
5U, 5V, 5W: Coil
61 to 64, 62A, 63A, Heat pipe
611, 621, 631, 641: Heat pipe heat collection section
612, 622, 632, 642: Heat pipe heat dissipation section
65 to 69: Heat pipe
7: Heat sink section
71: Base
72: Heat dissipation fin
81, 85: Heat transfer block
82, 86: Cooling hole (cooling passage)
9: Conventional configuration linear motor device
94: Core
942: Magnetic pole forming member
943: Contacting protrusion section
95: Coil
96: Cooling passage
10: Component mounter
110: Board conveyance device
120: Component supply device
130, 140: Component transfer device
150: X-axis rail
160: Component mounting head
170: Support rail
180: Display settings device
190: Base

What is claimed is:

1. A linear motor device comprising:
a track member with multiple magnets with alternating N poles and S poles arranged along a moving direction; and
a moving body including an armature which includes a core and coil, the moving body being movably mounted on the track member,
wherein a driving force in the moving direction is generated between magnetic flux of the core when current is passed through the coil and between the magnets of the track member,
wherein the core has a cross-shape including a first bar and a second bar that cross at a central portion, ends of the first bar are contacting protrusions configured to contact an adjacent core of the moving body,
wherein the second bar includes a first yoke and a second yoke that are separated by the first bar
wherein the coil is divided and wound around each of the first yoke and the second yoke, and
wherein the armature also includes a heat conduction member arranged in a cooling passage formed in the first bar of the core and in the contacting protrusion.

2. The linear motor device according to claim 1, wherein the cooling passage is a hole inside the first bar of the core or a groove formed in part by the contacting protrusion.

3. The linear motor device according to claim 1, wherein the armature includes a plurality of cores and coils that are separated into three phases, and the contacting protrusions of the respective cores contact each other between adjacent phases and regulate the positional relationship as well as extending partially a cross section through which the magnetic flux passes.

4. The linear motor device according to claim 3, wherein each of the cores includes multiple of the contacting protrusions respectively on both sides either facing another phase or facing outwards.

5. The linear motor device according to claim 3, wherein multiple of the cooling passages are in the contacting protrusions of the core.

6. The linear motor according to claim 3, wherein a groove is in the contacting surface of the contacting protrusion which regulates a positional relationship between adjacent contacting phases, and a shared heat conduction member is provided between the grooves of two contacting protrusions which contact each other.

7. The linear motor device according to claim 1, wherein the heat conduction member is a plurality of heat pipes connected to a heat sink section arranged on the outside of the core.

8. The linear motor device according to claim 7, wherein the heat sink section includes a base extending flatly and multiple heat dissipation fins established in a perpendicular direction to a surface of the base, and the heat pipes include heat pipe heat dissipation sections which extend connected to a bottom surface of the base of a heat sink section and include heat pipe heat collection sections which are connected to the heat pipe heat dissipation sections and are arranged in the cooling passages.

9. The linear motor device according to claim 8, wherein the heat pipes are bent between the heat pipe heat dissipation sections and the heat pipe heat collection sections.

10. The linear motor device according to claim 8, wherein at least two of the heat pipe heat dissipation sections extend in directions different from each other.

* * * * *